Patented Aug. 30, 1949

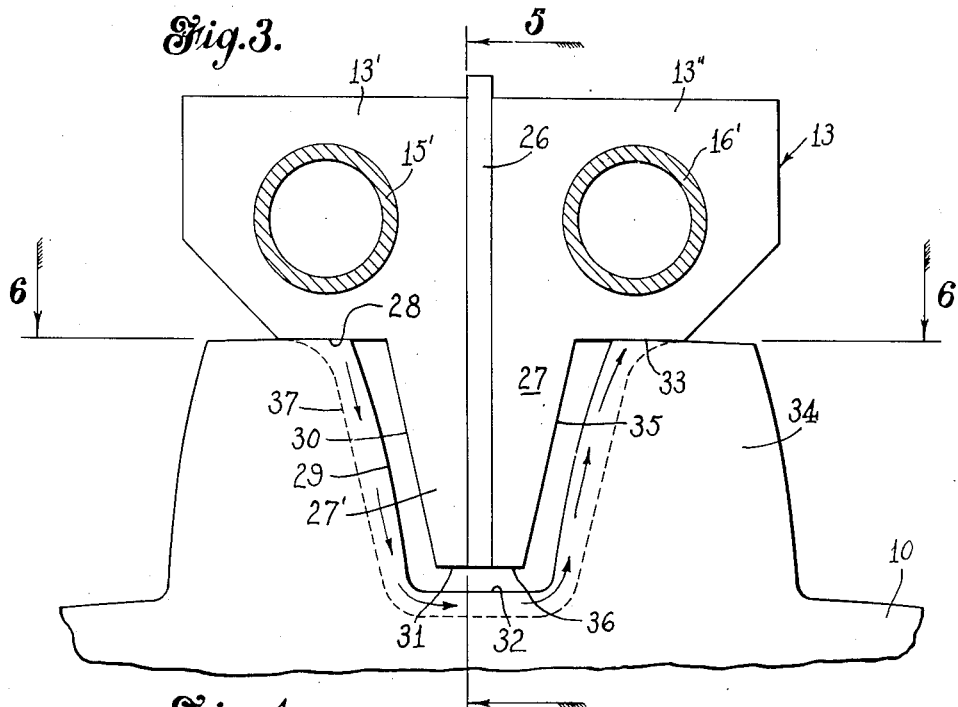
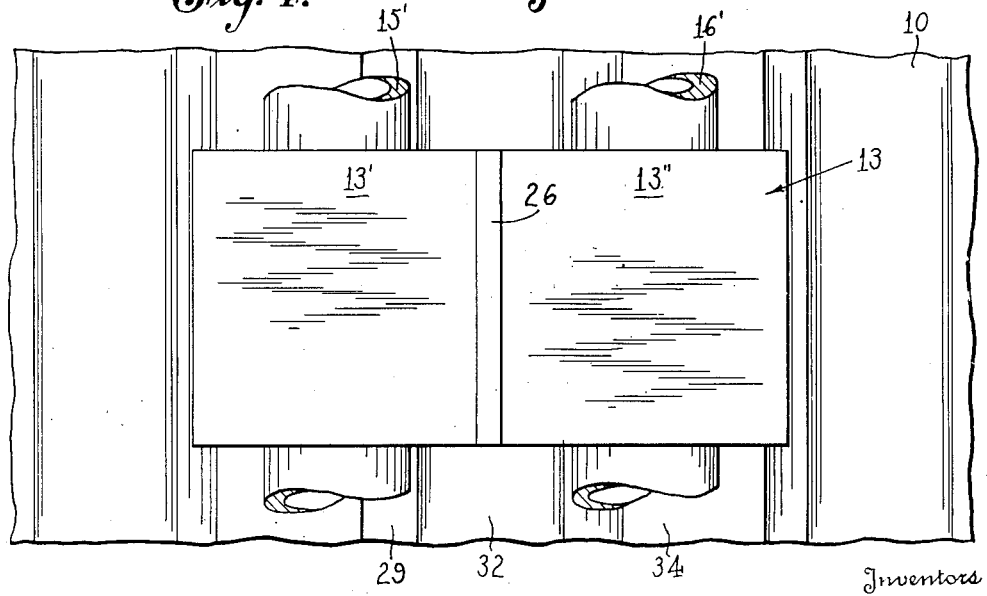

2,480,457

UNITED STATES PATENT OFFICE 2,480,457

METHOD OF AND APPARATUS FOR ELECTRICALLY HEATING GEAR TEETH

Johannes Erler, Orange, Conn., and Emil R. Gasser, Buffalo, N. Y., assignors to Farrel-Birmingham Company, Incorporated, Ansonia, Conn., a corporation of Connecticut Application May 5, 1945, Serial No. 592,204

2 Claims. (Cl. 219—11)

This invention relates to a new method of and apparatus for treating gears, and it has special reference to the heating of large gears in connection with hardening operations carried out on the gear.

In the past, gears having a diameter up to twenty-six inches and a face dimension up to five inches or thereabouts have been hardened by quenching them after the tooth portion of the gear was heated by induction throughout the gear periphery. The apparatus used was of such a character that the gear could be heated throughout its periphery by induction, and when the peripheral part of the gear was brought to the required temperature a quenching spray of water was brought into operation. In such a method of treatment, however, it has been impracticable to treat gears having dimensions considerably greater than those mentioned above. Moreover, in the usual methods of heating by induction, even where the gears are quite small, the heating means for the gear teeth at their outer parts has tended to cause too deep a penetration, with the result that the core portion or tough portion of the tooth has been too short and/or too pointed, resulting in a weak tooth. There has also been an objectionable lack of uniformity in the heating of the tooth across the face, that is to say, axially of the gear, and there has also been trouble as regards the lack of uniformity of heating in or adjacent the root portions of the teeth. Some larger gears have been hardened tooth by tooth by induction, but the roots of the teeth have been soft, and the tooth by tooth heating has been limited to gears with rather narrow faces.

Gears have, of course, been heated by means other than electric heating means, and one method of hardening is by carburizing, where carbon is added to the steel, the object being to produce a uniform hard layer of proper depth over the surfaces of the teeth, including the root portions. However, in the treatment of large gears it has been impracticable to use this method on account of the difficulties of moving and manipulating a body of such mass.

One of the objects of the present invention is to provide a method by which large gears can be successfully heated for hardening purposes.

Another object is to overcome the drawbacks of previous methods, as above pointed out.

Another object is to provide means whereby a large gear can be successfully heated at its toothed portion by movement of a heating element across the face, that is to say, parallel to the gear axis.

Another purpose of the invention is to provide a new method employing electric conduction for heating the faces and root portions of gear teeth, and to control the current path so that good results are obtained.

In the accompanying drawings:

Fig. 3 is a view on a larger scale of certain parts shown in Fig. 2, the conductor tubes being shown in section;

Fig. 4 is a fragmentary elevation looking toward the face of the gear;

Figure 1:
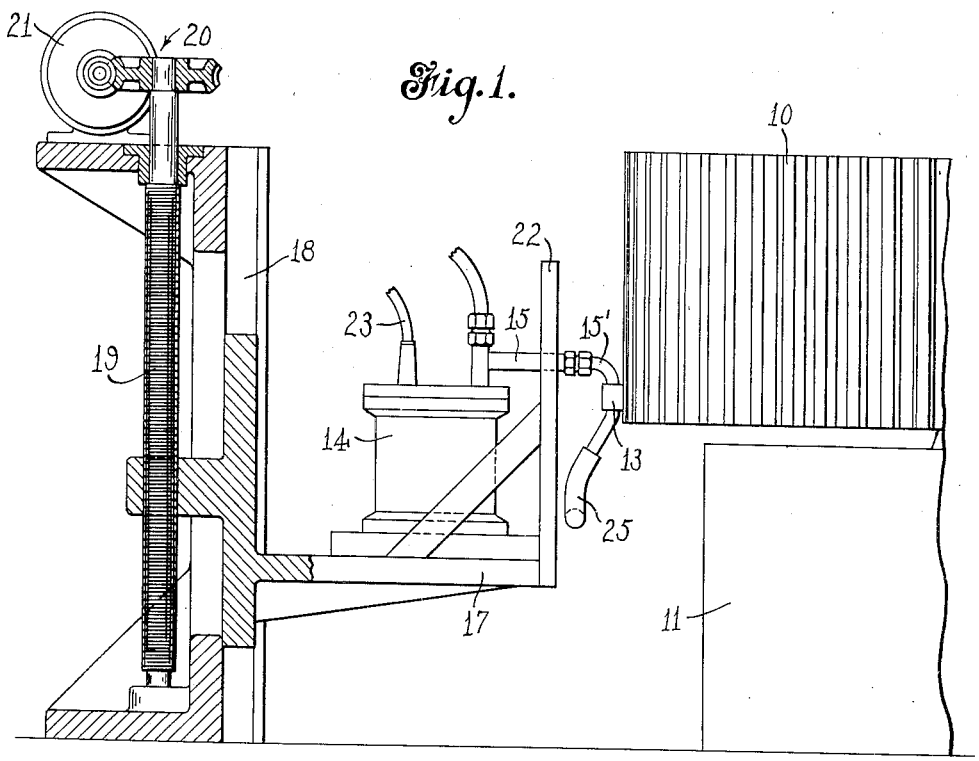
Fig. 1 is a diagrammatic view, partly in elevation and partly in section, showing apparatus used for the heating of gear teeth.

In heating large gears we find it desirable to heat portions of the gear periphery successively, the gear being stationary while a certain portion of its periphery is being heated. Usually it is preferred to support the gear in a horizontal plane, so that the teeth are in vertical planes, and to mount a heating element adapted to carry high-frequency current, by conduction, to portions of the gear in such a manner that said element can be traversed across the gear face for heating certain portions of the face successively. After the heating element has made a full traverse, it is preferred to give the gear, by appropriate means, an indexing movement. It is preferred to follow the heating element in its traverse by a moving water jet element, so that, after a portion of the gear has been brought to the required temperature, it is quenched, but the present invention is not concerned with the provisions for quenching, and as far as the present invention is concerned the quenching can be effected in any manner which is desired. The heating element, operating by conduction, usually conducts the heating current to the tips or summits of adjacent teeth, as hereinafter described, and has contact means at opposite sides engaging and moving along these summits, and it is preferred to begin the heating operation adjacent the lower side of the gear and move the heating element upwardly across the gear face. The heating element should be properly guided throughout its upward movement across the gear face.

In the illustrative embodiment shown in the drawings, a gear 10, which in this case is a large spur gear, is supported in a fixed position in a horizontal plane by means of a pedestal or support 11 having an arbor 12 fitting within the hub of the gear. Any suitable indexing means may be used for indexing the gear, and as this forms no part of the invention it is not shown in the drawings. During the operation of heating, the gear is fixed firmly in position so that it will have no movement as the heating element moves across the face in contact with certain of the teeth. The heating element is a block-like member 13, and in this particular case it is mounted to travel up and down with a transformer element 14 to which it is connected by water-cooled leads 15, 16. The transformer rests on a platform 17 movable vertically along a guideway 18. The platform can be moved by suitable means such as a screw spindle 19 rotatable by worm gearing 20 connecting the spindle to a prime mover such as an electric motor 21.

Between the gear and the transformer 14 an insulating panel 22 is interposed, said panel being fixed to the platform 17, and the leads 15, 16 being extended through the panel. The transformer receives heating current, usually high-frequency oscillating current, from a suitable generator, not shown, the connections on the transformer from the generator being indicated at 23 and 24. The leads 15 and 16 are usually water cooled. The water may pass from one to the other through a member such as a rubber tube 25, this connection being in a location below the heating element 13. Those portions of the leads 15, 16 which are adjacent the heating element 13 (and pass therethrough) preferably comprise copper tubes 15', 16'. It is understood, of course, that the tube 25 being constructed of rubber or other insulating material, the lower portions of the leads are insulated from each other, and that when the heating current reaches the element 13, in contact with the work, it can pass into the work.

The heating element 13, as herein shown, is a conductor block that comprises two contactor blocks 13' and 13'', these blocks being symmetrically arranged with reference to a median plane and being separated from each other by means such as an insulating plate 26 of mica or other suitable material, which plate is in said median plane. Each of these contactor blocks is connected to one of the copper tubes.

The block of the heating element 13 is arranged to make contact with the summits of two adjacent gear teeth in the manner shown in Fig. 3, said block having at opposite sides portions adapted to engage the respective tooth summits, and having also a current-conducting mass 27 which we refer to as a nose, extending into the space between the teeth with a certain amount of clearance. This mass or nose 27 is formed partly on block section 13' and partly on section 13'', the nose portion being traversed by the insulating plate 26, which in this form extends across the nose as well as across the body portion of the heating block.

By reference to Fig. 3 it will be seen that block section 13' presents a body through which conductor tube 15' extends, the body being reduced in width at the inner part to present a planar contact surface 28 engaging the planar outer or end surface of the tooth, which is indicated at 29. It will also be noted that from the plane of surface 28 the block section is extended to provide a section 27' of nose 27 extending inwardly along the side face of tooth 29 with a substantial amount of lateral clearance. The nose section 27' has an inclined planar side face 30 meeting surface 28, and at the tip of section 27' is a planar tip surface 31 generally parallel to and spaced from the root portion 32 between the teeth. The block section 13'' has parts corresponding to those just described, there being a flat contact surface 33 making contact with a portion of the summit of the tooth 34, and there being nose surfaces 35 and 36 corresponding to surfaces previously described. It is understood, of course, that for gear teeth of certain dimensions a heating block of certain dimensions is required, the latter having at the inner part shoulders facing away from the butt end of the block presenting flat elongated contact surfaces extending parallel to the teeth throughout the thickness of the block contacting the tooth summits or top faces over predetermined areas nearest the valley between two adjacent teeth, and the nose having forwardly and inwardly converging side surfaces which are located at the proper distances from the side faces of the teeth, and the tip of the nose having a surface spaced at the required distance from the root circle of the gear.

The portions of the heating block presenting the contact portions 28 and 33 are shown as being integral parts of the block, but for making the electrical contacts with the teeth, inserts of a suitable alloy may be employed.

The current source connected to the transformer 14 may be, for example, a thermionic generator comprising a step-up transformer and bridge-type rectifier operating from the A. C. power line, and a vacuum tube oscillator. A heating current of high frequency is desirable, and a frequency within the range of from 100,000 to 10,000,000 cycles per second may be employed advantageously.

Figure 2:
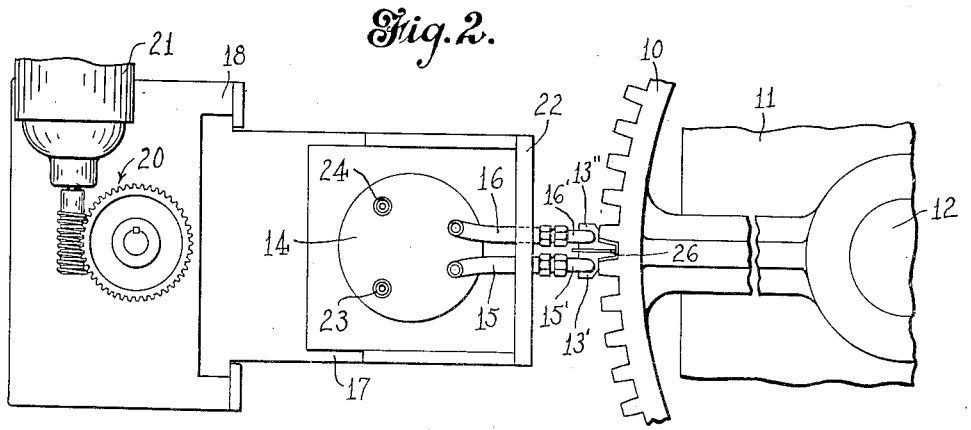
Fig. 2 is a top plan view of certain parts shown in Fig. 1.
Figure 5:
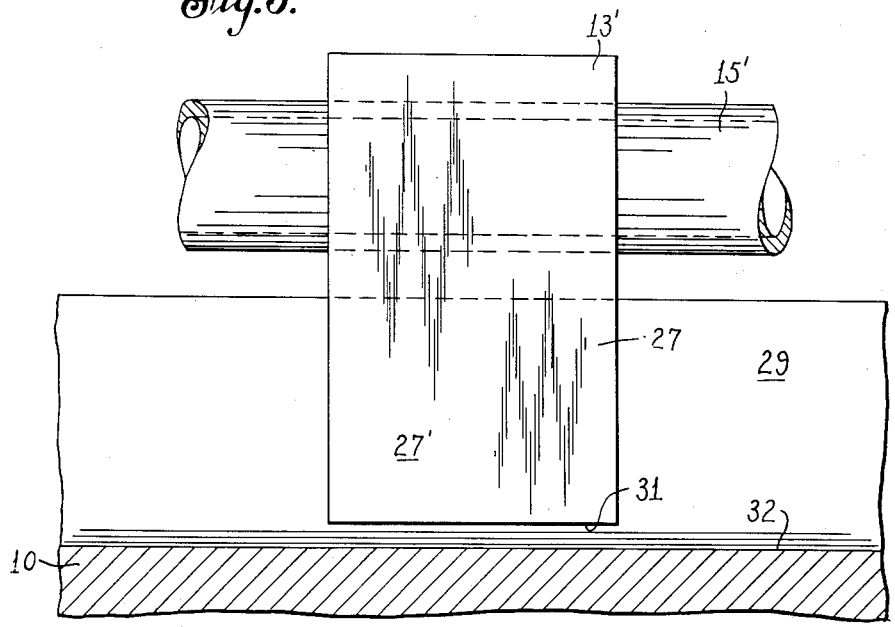
Fig. 5 is a section on line 5—5 of Fig. 3.

In the operation of heating the toothed portion of a gear, the initial set-up will preferably be substantially as shown in Figs. 1 and 2, although at the start of operations contact block 13 will be bridged across two adjacent teeth so as to be approximately flush with the lower side face of the gear. The heating circuit will then be closed so as to heat a portion of the gear periphery, and after such portion has been heated to the proper temperature the contact block is moved upwardly to heat an additional area, movement being effected by turning the screw spindle 19. This operation will be continued until the contact block has traversed the face of the gear. The contact block will then be moved out of engagement with the gear and the gear indexed so that the block on the next traverse can be in bridging relation to an adjacent tooth space.

In the operation of heating, the heating current will pass from the contact member in contact with the top of one tooth inwardly adjacent the side face of the tooth, across the root portion, and outwardly along the side portion of the adjacent tooth to the summit of that tooth. The course of the current may be as indicated by the arrows in Fig. 3. This brings a portion of the workpiece into the electrical circuit, namely, that portion extending along the facing sides of two adjacent teeth and across the root portion. It will be understood, of course, that current entering say by lead 15' is conducted by the block to the summit of one tooth and passes through the course just mentioned to the summit of the adjacent tooth and to conductor lead 16'. It is difficult to describe the exact manner in which the nosepiece 27 functions, but evidently eddy currents are induced in its parts located at opposite sides of the insulation plate. This nosepiece has a very advantageous effect, as has been determined by observation of the gear portions which become highly heated, which portions are usually in an outer zone the inner boundary of which is indicated by the dotted line 37 in Fig. 3. This zone is indicated by the coloring of the heated metal. It is a zone of approximately uniform depth from points near the summits of the two teeth along the sides of the teeth and across the root portion. In this zone the heating is substantially uniform. Therefore, by providing this uniform zone of heating to the required depth and no farther, for purposes of quenching and hardening, the gear can be completely and effectively hardened in all of the locations where this is desirable, and on the other hand the gear teeth will have strong tough cores of sufficient length and proper cross section.

Figure 6:
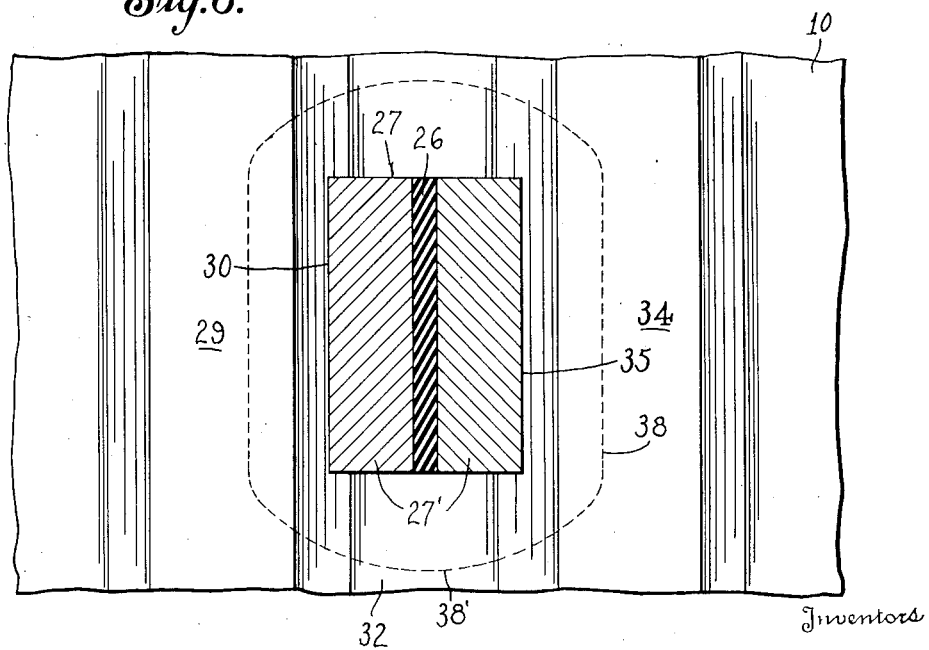
Fig. 6 is a section on line 6—6 of Fig. 3.

The nosepiece has the effect of narrowing and densifying and locating the current path in what may be termed the plane of the gear, as shown in Fig. 3, as will appear from what has been said above. The plane of the gear is the plane perpendicular to the gear axis in which the body of the gear is located. Another important effect, however, is a confining action upon the current path in a direction perpendicular to the gear plane. This is indicated in Fig. 6, where the dotted line 38 indicates an area enclosing the contact block, within which the path will for the most part be confined. It will be noted that the ends 38' of the loop 38 are not very far away from the ends of the contact block, and this means that the current path cannot be spread out to a large degree beyond the block ends. If it did spread out to the side it would be dissipated to too great an extent in the body of the workpiece. This action of the nosepiece in confining the current path laterally with respect to the block is especially important in heating areas at intermediate points of the gear face. It is ordinarily more difficult to secure proper penetration of the heat intermediate of the gear face than at the ends of the face. In practising the present method, however, there is no trouble on this score. It is believed that in operation eddy currents are set up in the nosepiece, and that these have effect in narrowing the current paths in the manner described. It is to be noted that the conducting masses in which these currents are set up are, in this embodiment, integral with the conducting masses in which the conductors 15, 16 are embedded.

Instead of using an insulating plate between the two sections of the block, the separation may be made by means of an air gap, if desired.

A notable advantage over the flame hardening process, which has heretofore been employed, arises from the fact that the root portions of the teeth can be very effectively hardened. It will also be noted that the present process enables the heated (and later hardened) layer to be of maximum depth at the pitch line, which is most desirable. In the example shown in Fig. 3, the heated layer is of greatest depth adjacent the pitch line. It is of somewhat less depth along the root portion, and it is of even less depth at the center of the tooth summit. These features are very desirable in practice.

In the operation of the device the contact block is pressed firmly against the summits of adjacent teeth, and this pressing action can be brought about in any desirable manner. The block moves across the face of the gear with considerable speed, all things considered. The width of the gear face is usually considerably greater than the length of the block. It is to be understood, however, that there may be cases in which the lengthwise movement of the block is unnecessary.

As it is important to obtain good contact between the contact block and the tops of the teeth, the tooth tops should be ground smooth before the described treatment is given.

By the procedure described, the portion of the tooth to be heated is brought to the required temperature very rapidly. Supposing the contact block to be in a position where its lower face is substantially flush with the lower side of the gear, the adjacent tooth portions will be brought to the required heat within a few seconds after the current is turned on, and the contact block making sliding contact with the summits of the teeth can then be moved across the gear face at a good rate of speed. The method has the advantage that massive work can be handled with great convenience, making use of apparatus which is relatively inexpensive compared to one in which all of the teeth on the gear would be heated at the same time. Nevertheless, considering the results achieved, the work can be done with comparative rapidity. The results are such, moreover, with respect to the character of the work done that it is advantageous to use the method for treating small gears as well as large ones. The resulting product is a superior one because the gear has very superior physical characteristics and the gears can be made with great precision in a procedure which is convenient and can be carried out at relatively low expense.

The procedure described is by way of example only, and it will be understood that various changes in the steps and in the apparatus used may be made without departing from the principles of the invention or the scope of the claims.

What we claim is:

1. The method of heating the toothed portion of a gear of conducting material, which comprises conducting heating current into the gear at the summits of two next adjacent teeth in a plane substantially perpendicular to the axis thereof, by placing against the top surfaces of said two teeth in regions near the inner side surfaces of said teeth contact members connected to respective conductor leads and insulated from each other, and placing in the space defined by the side faces of said teeth and the intervening root portion a conductive mass supported from and forwardly of said contact members and providing a nose having forwardly converging side surfaces extending between said teeth in spaced relation to said teeth and the intervening root portion, and in which current is induced by the action of the conducted current for modifying the path of the conducted current in the tooth portion of the gear.

2. Means for heating the toothed portion of a gear, comprising a current-carrying block divided into lateral sections having butt portions for connection with conductor leads and forwardly facing shoulder contacts at their sides engageable with the summits of two next adjacent teeth to conduct current into the gear in a plane generally perpendicular to the gear axis, said sections being insulated from each other, a conducting mass supported from the block forwardly of said contacts providing a nose having forwardly converging side surfaces to extend between the said teeth in spaced relation to said teeth and the intervening root portion, hollow conductor leads passing into the respective sections at their butt portions and supporting the block, and means for moving the leads so as to move the block across the face of the gear while maintaining the engagement of said shoulder contacts with the tooth summits.

JOHANNES ERLER.
EMIL R. GASSER.

REFERENCES CITED

The following references are of record in the file of this patent:

UNITED STATES PATENTS

| Number | Name | Date |
| --- | --- | --- |
| 1,247,741 | Taylor | Nov. 27, 1917 |
| 2,080,220 | Butter et al. | May 11, 1937 |
| 2,102,040 | Slade | Dec. 14, 1937 |
| 2,156,884 | Sykes | May 2, 1939 |
| 2,164,310 | Denneen et al. | July 4, 1939 |
| 2,186,626 | Dake | Jan. 9, 1940 |
| 2,240,493 | Denneen | May 6, 1941 |
| 2,338,496 | Denneen et al. | Jan. 4, 1944 |
| 2,364,623 | Denneen et al. | Dec. 12, 1944 |

FOREIGN PATENTS

| Number | Country | Date |
| --- | --- | --- |
| 416,928 | Great Britain | Sept. 17, 1934 |